Patented July 12, 1949

2,475,626

UNITED STATES PATENT OFFICE 2,475,626

COMBUSTION RETARDING COATING COMPOSITION

Martin Leatherman, Bel Air, Md.

No Drawing. Application September 24, 1945, Serial No. 618,375

5 Claims. (Cl. 260—29.1)

(Granted under the act of March 3, 1883, as amended April 30, 1928; 370 O. G. 757)

This application is a continuation-in-part of my co-pending application Serial Number 447,871, filed 20 June 1942, which issued as U. S. Patent No. 2,407,668 on September 17, 1946.

This application is made under the act of March 3, 1883 as amended by the act of April 30, 1928, and the invention herein described and claimed, if patented, may be manufactured and used by or for the Government of the United States of America for governmental purposes without the payment to me of any royalty thereon.

This invention relates to fire retarding or fire resistant coatings for combustible fibrous materials in filamentary or foraminous, reticulated form, whether woven, felted or in layers and is applicable to cotton, rayon, wool, silk and the like.

My invention is adaptable to make various types of finished articles. It can be used to produce a water repellant but porous finish or it can be used to produce a rubber-like coating which is impermeable to air. If the fabric to be coated is immersed in my composition and then squeezed lightly, a thin fabric such as 80 square print cloth shows numerous tiny pinholes which permit free passage of air, but which offer considerable resistance to the passage of water. If the dipped fabric is immediately brushed on one side with my composition, an elastic flexible rubber-like and impermeable finish results which adheres tightly to the dipped and squeezed fabric. The unbrushed side retains its soft fabric-like appearance and feel. If, however, the dipped and lightly squeezed fabric is again dipped and excess composition scraped off without squeezing, an adherent rubber-like finish is imparted to both faces of the fabric.

The flexibility, elasticity and generally rubber-like appearance of my composition is imparted by the presence of suitable amounts of acrylate or methacrylate ester polymers. These polymers have little or no flame resistance but contribute the desirable physical properties. Another resinous constituent of my composition is either polyvinyl chloride or a co-polymer of vinyl acetate and vinyl chloride. The addition of even a few parts of acrylate or methacrylate ester polymer to the polyvinyl chloride or co-polymer of vinyl acetate and vinyl chloride imparts much improved elasticity and toughness to my coating composition.

A third constituent of my composition is zinc oxide. When the coated material is subjected to ignition temperatures, the zinc oxide acts as a dechlorinating catalyst to free hydrochloric acid from the vinyl polymer. The hydrochloric acid has excellent flame preventing properties and imparts fire-resistant qualities to the coated material. At the temperatures specified, the zinc oxide also acts as a dehydration catalyst in the case of cellulosic materials to split the carbohydrate into water and carbon, thus assisting in preventing flaming.

A fourth constituent of my composition may be some form of opaque pigment which while not required as a flameproofing ingredient, may be desirable to screen out light which in some cases acts deterimentally on the vinyl polymer constituent. A fifth constituent is a suitable plasticizer or softener, a preferred form of which is tricresyl phosphate although certain chlorinated diphenyls, dibutyl phthalate, triphenyl phosphate or any other compatible plasticizer or mixture of plasticizers may also be used.

In practicing my invention a preferred method is to dissolve the resinous constituents together with the plasticizer in compatible solvents and suspend the zinc oxide and pigments in the solution by any suitable dispersion method. The effect obtained is in large measure determined by the proportion of solvent or diluent present.

The following examples of compositions embodying my invention are given by way of illustration but not of limitation.

Example 1

15 lbs. of vinyl acetate-vinyl chloride copolymer, 5 lbs. of n-butyl methacrylate, 10 lbs. tricresyl phosphate, 7 lbs. triphenyl phosphate, 10 lbs. of zinc oxide, 4.2 lbs. of inert pigment, 27 lbs. of acetone, 27 lbs. of the solvent known by the trade name of Solvesso No. 2, 8.7 lbs. of mineral spirits and ½ lb. of pentachlorphenol.

As additional ingredients I can also employ such fungicides as copper naphthenate, cadmium naphthenate, zinc naphthenate, zinc pentachlorphenate, halogenated phenyl phenates and the like in amounts approximating 1% of the weight of the fibrous material.

In the examples I may substitute the methyl, ethyl or propyl polymerized ester of acrylic acid or of methacrylic acid for a n-butyl methacrylate and likewise I may use a polyvinylchloride resin instead of the co-polymer of vinyl acetate and vinyl chloride depending upon the degree of flame resistance desired, I may vary the relative proportions of the resinous components with respect to each other. The less methacrylate or acrylate resin present with respect to vinyl chloride resin the greater the degree of flame resistance. However, if the relative amount of the former is dropped too low, adhesion, flexibility and elasticity are lessened undesirably in view of the presence of the suspended solids. On the other hand, if too much of the acrylate or methacrylate resin is substituted for the vinyl resin fire resistance is reduced. In general it would not be desirable to use more methacrylate or acrylate resin than vinyl resin in the composition.

The coating characteristics are largely determined by the viscosity of the coating composition. If the viscosity is reduced by addition of solvent, an impregnated type of finish is obtained upon evaporation of solvent, that is, the fibrous material absorbs the composition and the pores remain open. With increased viscosity, penetrative qualities of the composition are decreased and a continuous film or coating of a rubber-like nature covers the whole surface of the fabric. In this form the coating is impervious to air. An advantage of this continuous film lies in the fact that, because of the thermoplasticity of my composition, the coated fabric can be lapped and caused to form a strong bond by the application of heat.

*Example II*

7.5 parts of a 33⅓% solution of n-butyl methacrylate polymer in equal parts of xylol and butanol is blended with 30 parts of a 25% solution of co-polymer of vinyl chloride and vinyl acetate in acetone, 5 parts of tricresyl phosphate is added and 5 parts of zinc oxide together with a suitable amount of inert pigment are suspended in the resin solution by use of conventional paint grinding equipment.

*Example III*

20 lbs. polyvinyl chloride, 10 lbs. of zinc oxide, 8 lbs. of tricresyl phosphate, 7 lbs. triphenyl phosphate, 12 lbs. of inert pigment, 45 lbs. of acetone, 0.8 lb. zinc naphthenate and ½ lb. of pentachlorphenol.

It is understood that the examples above cited can be varied with respect to the proportions of all constituents. As stated before, I may vary the relative proportions of vinyl chloride polymer and methacrylate or acrylate polymer. I may vary the proportion of zinc oxide to vinyl polymer. A preferred range is from 1 part zinc oxide to 1½ parts of vinyl polymer to 1 part zinc oxide to 3 parts of vinyl polymer. The absolute amount of inert pigment used will vary with the severity of weather exposure and with the type of pigment used. The proportion of plasticizer will vary with the degree of flexibility desired and with the type of plasticizer used. Finally the solvent employed can be any individual solvent or blend of solvents which is compatible with the synthetic resin mixture in my composition. Among the solvents which can be employed at least in part are acetone, ethanol, butanol, isobutanol, diacetone alcohol, xylol, toluol, naptha or Stoddard solvent.

It is also understood that the fire resistant qualities of my coating composition do not reside in the acrylate or methacrylate polymers. If desired, for certain purposes, these may be omitted completely, in which case, provided the plasticizer is also omitted, a composition is obtained which may be used to provide a fireproof, non-flexible coating for cotton yarn and fabrics.

Applicant is informed that Solvesso No. 2 is a blend of aromatic solvents, of which the major constituent is toluol, having a specific gravity of 0.858 and a boiling point range from 265° F. to 375° F.

I claim:

1. A composition for rendering fabric rot- and fire-resistant, comprising the following materials in substantially the proportions stated: 15 lbs. vinyl acetate vinyl chloride copolymer, 5 lbs. n-butyl methacrylate polymer, 10 lbs. tricresyl phosphate, 7 lbs. triphenyl phosphate, 10 lbs. zinc oxide, 27 lbs. acetone, 27 lbs. of a solvent consisting mainly of aromatic compounds having a specific gravity of about 0.858 and a boiling range from 265° F. to 375° F., 8.7 lbs. mineral spirits, 4.2 lbs. inert pigment, and ½ lb. pentachlorphenol.

2. A composition for rendering fabric rot- and fire-resistant, comprising the following materials in substantially the proportions stated: 7.5 parts of a 33⅓% solution of n-butyl methacrylate polymer in equal parts of xylol and butanol, 30 parts of a 25% solution of copolymer of vinyl chloride and vinyl acetate in acetone, 5 parts of tricresyl phosphate, 5 parts of zinc oxide, and a suitable amount of inert pigment.

3. A composition for rendering fabric rot- and fire-resistant, comprising the following materials in substantially the proportions stated: 20 lbs. polyvinyl chloride, 10 lbs. zinc oxide, 8 lbs. tricresyl phosphate, 7 lbs. triphenyl phosphate, 12 lbs. inert pigment, 45 lbs. acetone, 0.8 lb. zinc naphthenate, and ½ lb. pentachlorphenol.

4. A composition for rendering fabric rot- and fire-resistant, comprising a vinyl polymer of the group consisting of polyvinyl chloride and copolymers of vinyl acetate and vinyl chloride, zinc oxide in the proportion of 1 part zinc oxide to 1½-3 parts of vinyl polymer, at least one plasticizer of the group consisting of tricresyl phosphate, triphenyl phosphate, dibutyl phthalate, and chlorinated diphenyl, at least one solvent of the group consisting of acetone, diacetone alcohol, ethanol, butanol, isobutanol, mineral spirits, naphtha, Stoddard solvent, toluol, and a solvent consisting of aromatic compounds having a specific gravity of about 0.858 and a boiling range from 265° F. to 375° F., and a suitable amount of inert pigment, said plasticizer and solvent being in quantity to produce the desired consistency.

5. A composition as defined in claim 4 including a material of the group consisting of n-butyl methacrylate polymers and the ethyl, methyl, and propyl ester polymers of acrylic and methacrylic acids in sufficient proportions to improve the elasticity and toughness of the composition.

MARTIN LEATHERMAN.

REFERENCES CITED

The following references are of record in the file of this patent:

UNITED STATES PATENTS

| Number | Name | Date |
|---|---|---|
| 2,167,278 | Leatherman | July 25, 1939 |
| 2,271,581 | Bogin | Feb. 3, 1942 |
| 2,407,668 | Leatherman | Sept. 17, 1946 |